Nov. 4, 1969  R. E. SULLIVAN  3,476,511
CALCINATION PROCESS FOR KAOLIN-CONTAINING CLAY
Filed Nov. 18, 1965  2 Sheets-Sheet 1
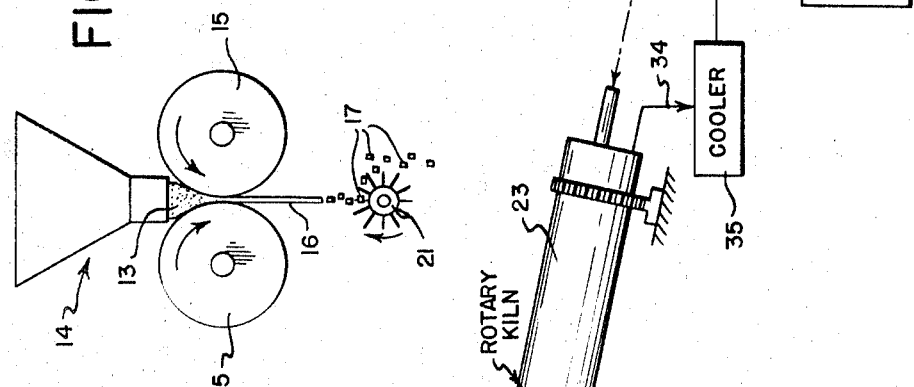
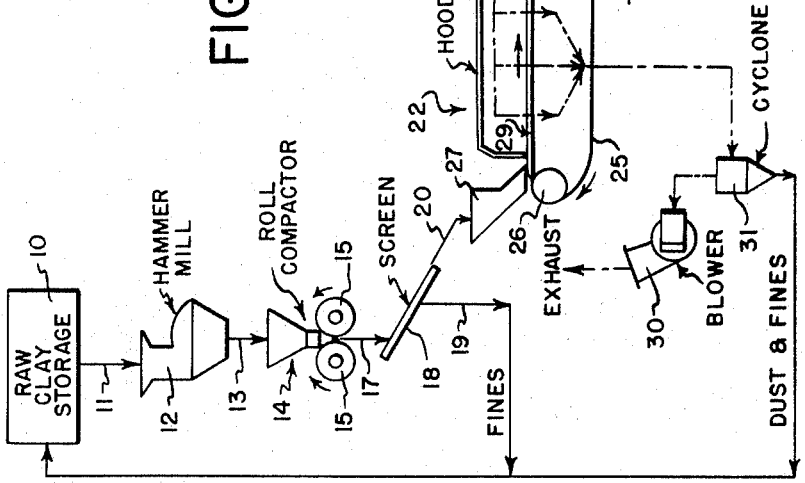
INVENTOR
Robert E. Sullivan
BY
Pennie, Edmonds, Morton, Taylor & Adams
ATTORNEYS

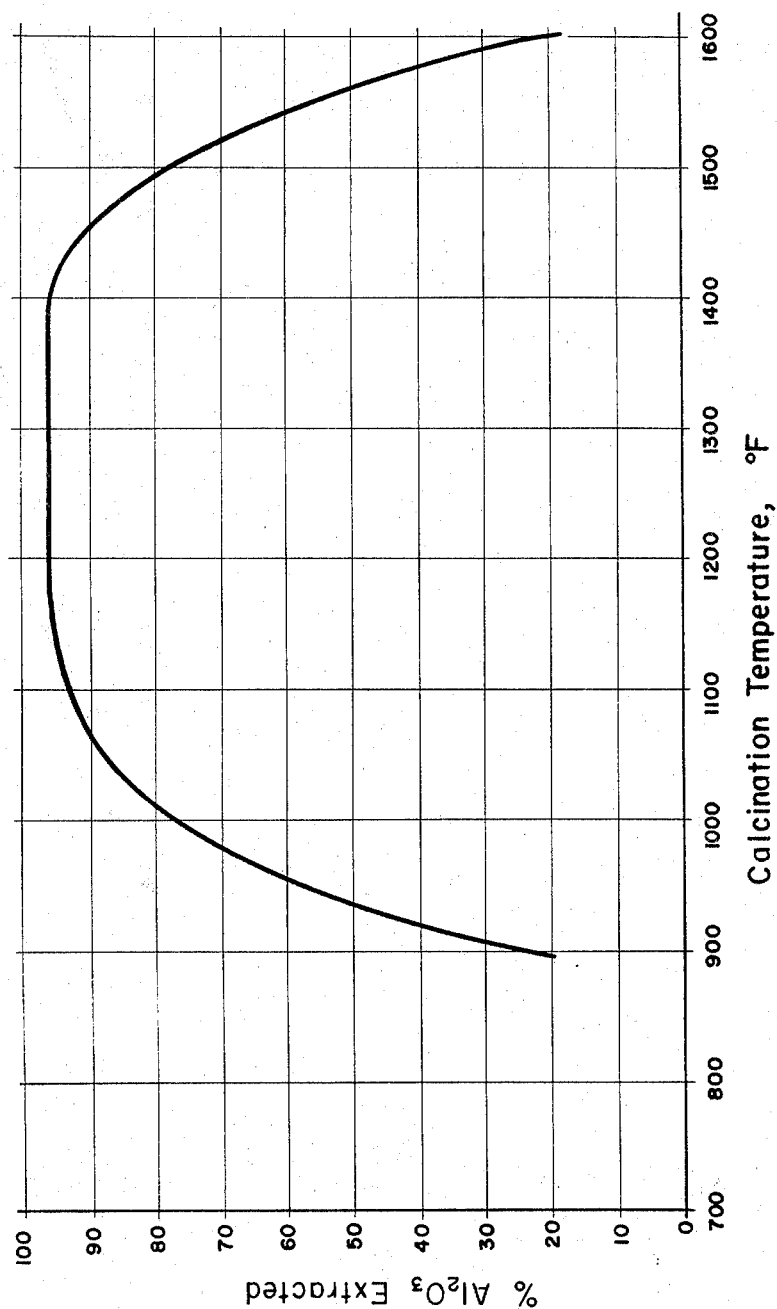

United States Patent Office 3,476,511
Patented Nov. 4, 1969

3,476,511
CALCINATION PROCESS FOR KAOLIN-CONTAINING CLAY
Robert E. Sullivan, Anaconda, Mont., assignor to The Anaconda Company, a corporation of Montana
Filed Nov. 18, 1965, Ser. No. 508,506
Int. Cl. C01b 33/26; C01f 7/00
U.S. Cl. 23—110           8 Claims

ABSTRACT OF THE DISCLOSURE

Kaolin-containing clay is prepared for digestion with a mineral acid by first compacting the clay to form a sheet of compacted clay from ¼" to ⅝" in thickness, breaking the sheet of compacted clay into flakes at least ½" in length, heating the flakes of compacted clay at a temperature of from 300° to 800° F. to form dry, partially dehydrated flakes of clay having sufficient mechanical strength to withstand the tumbling action of a rotary kiln, and calcining the dry, preheated flakes of clay at a temperature of from 1100° to 1450° F. to drive off substantially all of the remaining water content of the clay.

---

The conventional electrolytic process for the production of metallic aluminum from alumina requires that the alumina employed as a feed material for the electrolytic cells or pot lines of the process be substantially free of harmful metallic contaminants. Pot line grade alumina can be produced from high grade bauxite ores by any of several well-known procedures. However, the supply of naturally-occurring bauxite that can be processed economically into pot line grade alumina is limited, and alumina producers have devoted a great amount of time and effort to the development of other aluminum-containing ores that may be converted into alumina that is substantially free of harmful contaminants. For example, it has heretofore been proposed that kaolin-containing clay, which is plentiful and relatively inexpensive and which consists mainly of hydrated aluminum silicates together with minor amounts of a variety of other minerals, be employed as the source of aluminum in the preparation of pot line grade alumina.

A typical kaolin-containing clay may comprise approximately 45% by weight $SiO_2$, about 38% by weight $Al_2O_3$ and about 14% by weight combined $H_2O$ (water of hydration) on a dry basis, and naturally-occurring clay is usually a somewhat plastic material containing, in addition to its water of hydration, up to 20% or more by weight of free moisture. The aluminum content of such clays can be extracted therefrom by leaching the clay with a mineral acid, for example hydrochloric acid, to obtain water soluble aluminum salts which may then be recovered and treated to convert the aluminum content thereof to alumina. However, it has heretofore been found that in order to obtain a commercially acceptable percentage recovery or yield of the aluminum content of the clay, substantially all of the water content of the clay, both free and combined, must be evaporated or driven therefrom before the clay is treated with the mineral acid. Accordingly, it has heretofore been the usual practice to dehydrate the raw clay prior to the acid treatment thereof by calcining the clay, for example in a rotary kiln, to obtain a dehydrated and calcined clay product.

Although calcination of the clay greatly increases the acid-leach availability of the aluminum content thereof, the calcining operation has proved to be erratic and difficult to control so that consistent results and a uniformly calcined product have not heretofore been readily obtained. Moreover, the tumbling action of the kiln causes an excessive amount of dust and fine particles of clay to be produced which not only is economically undesirable but which results in the production of an unevenly calcined clay product. That is to say, because fine particles are more readily heated to calcining temperatures than are the larger particles of clay, the excessive production of dust and fine particles in the calcining operation results in a proportionately large production of over-calcined particles of clay. Clay which is calcined at too high a temperature is converted to a form of aluminosilicate which is not readily soluble in most mineral acids, and in particular hydrochloric acid. As a consequence, not only is dust formation, and resulting dust losses, excessively large when clay is calcined in the conventional manner, but only about 85 to 95% of the aluminum content of the calcined material discharged from the kiln is recovered when this material is treated with acid in the usual manner.

In view of the potential importance of kaolin-containing clay as a source of pot line grade alumina, workers in this field have attempted for many years to develop new or improved procedures for dehydrating and calcining such clays which overcome the shortcomings of the conventional process. However, no process heretofore proposed has resulted in the commercial production of uniformly calcined clay having the required consistently high availability of aluminum. After an extensive investigation into the causes for the unsatisfactory results obtained in the conventional calcining process, I have now discovered that both the excessive dust formation and the inconsistent results obtained as a result thereof are due primarily to the relatively high moisture content and the wide range in the size of the particles of the unconsolidated raw clay which comprise the feed material introduced into the rotary kiln, and to the lack of control over calcining temperatures resulting from the excessive quantity of fine particles and dust formed during the calcining operation. Moreover, I have found that by appropriate treatment of the raw clay prior to the calcining operation so as to produce dry compact particles of clay of substantially uniform size possessing appreciable mechanical strength, and by careful control of the calcining temperature to prevent overheating of the compacted clay particles, I can produce a uniformly calcined clay product without excessive dust losses that consistently has an aluminum acid-leach availability of 95% or better.

My process of preparing kaolin-containing clay for the extraction of the alumina content thereof with a mineral acid, for example, hydrochloric acid, comprises first compacting the raw moist clay into a sheet-like body of compact clay advantageously having a thickness of between about ¼ to ⅝ inch, the thus compacted clay being broken into flakes of substantially uniform size each advantageously having a maximum dimension of not more than about 2 inches and a minimum dimension of not less than about ½ inch. The flakes of compacted clay are screened or otherwise treated to remove substantially all particles of clay smaller than about ½ inch, and the clay flakes are then heated, advantageously on a travelling grate pre-heater, to a temperature sufficient to drive substantially all of the free moisture, and advantageously a portion of the combined water, therefrom and thereby produce dry flakes of compacted clay having sufficient mechanical strength to withstand without excessive size degradation the tumbling action of a rotary kiln. The dried, pre-heated flakes of compacted clay are then calcined, advantageously in a rotary kiln, at a tempertaure within the range of 1100° to 1450° F., and preferably within the range of about 1200° to 1400° F., for a sufficient length of time to drive substantially all of the remaining water (i.e., the remaining water of hydration) from the clay. The calcined flakes of the dehydrated compacted clay are then cooled, and advantageously are ground so that substantially all of the calcined clay product is smaller than 8 mesh, prior to being treated with a mineral acid to extract the aluminum content thereof.

The calcination of the dry, compacted flakes within the temperature range herein specified results in the production of a friable material that may be readily ground into fine particles in conventional grinding apparatus. The yield of aluminum obtained when the ground calcined material is leached with hydrochloric acid is high and exceptionally consistent, the percentage of aluminum recovered being in the order of 95 to 99% of the aluminum present in the calcined material. The superior results obtained with my new process, as compared with conventional calcining and acid extraction processes, are due to the superior mechanical strength of the dried flakes of compacted clay which minimizes the formation of dust and fines in the rotary kiln, to the absence of fines in the rotary kiln which would result in the production of an over-calcined clay product, to the substantially uniform size range of the flakes being calcined which assure that all of the material is heated to substantially the same optimum calcining temperature uniformly throughout each flake, and to the calcination of the compacted flakes at a temperature preferably between about 1200° and 1400° F. in which temperature range substantially all of the aluminum content of the calcined material is converted to a form which can be readily extracted with a mineral acid, such as hydrochloric acid.

My process for preparing kaolin-containing clay for the extraction of the aluminum content thereof with a mineral acid will be better understood from the following description thereof in conjunction with the accompanying drawings of which FIG. 1 is a schematic flow sheet of an advantageous embodiment of the practice of my invention, FIG. 2 is a schematic view of a roll compactor advantageously employed in the compacting step of my process, and FIG. 3 is a graph showing the relationship between the temperature at which the compacted flakes are calcined and the percent of the total aluminum content of the calcined material extracted therefrom during the subsequent treatment with hydrochloric acid.

Naturally occurring kaolin-containing clay is, as previously mentioned, a somewhat plastic material containing, typically, up to about 20% by weight free moisture in addition to the water of hydration of the kaolin constituents of the clay, and it is known that substantially all of the water, both free and combined, should be removed therefrom in order to obtain a commercially satisfactory recovery of the aluminum content of the clay. The water content of the clay is most readily driven therefrom by calcining the clay in, for example, a rotary kiln, and I have discovered that the clay must be calcined within a fairly critical temperature range in order to assure that substantially all of the water is removed from the clay and at the same time to avoid heating the clay to a temperature high enough to convert the dehydrated aluminum silicate content thereof to a crystalline form that does not readily dissolve in a mineral acid. Moreover, in order to achieve the required control of the temperature at which the clay is calcined and to avoid overheating any significant amount of clay, I have found that the clay should be in the form of particles of substantially uniform size and further that these clay particles have sufficient mechanical strength so that the formation of fines in the calcining operation will be minimized.

To achieve these ends the raw clay comprising the feed material for my process is first compressed or compacted to form flakes of compacted clay of approximately uniform size. The flakes of compacted clay are then subjected to a sizing operation to remove fine particles and dust therefrom, and the sized flakes are heated to a temperature advantageously within the range of about 300° to 800° F. to drive off substantially all of the free moisture content, and advantageously a portion of the combined water of hydration, of the clay flakes and thereby produce dry, pre-heated flakes of compacted clay having sufficient mechanical strength to withstand the tumbling action of a rotary kiln without excessive breaking up of the flakes into smaller particles and, in particular, dust. The dry pre-heated flakes of compacted clay are then calcined at a temperature within the range of from about 1100° to 1450° F., and preferably from about 1200° to 1400° F., to drive off substantially all of the remaining combined water content of the clay. The dehydrated flakes of compacted clay thus produced are then advantageously ground up in conventional grinding apparatus to obtain a calcined clay product the aluminum content of which may readily be extracted by leaching with a mineral acid.

An advantageous arrangement of apparatus adapted to carry out my process is shown schematically in FIG. 1 of the drawing. Raw, run-of-the-mine clay comprising a mass of lumps of clay of various sizes and commonly containing up to 20% or more by weight of free moisture is delivered to storage bin 10. The raw clay 11 from storage bin 10 is first advantageously shredded or pulverized in a hammer mill or like device 12 to break up the larger lumps and obtain an unconsolidated mass of clay particles of roughly uniform size. The unconsolidated clay particles 13 from the mill 12 are then introduced into the feed hopper of a roll compacter 14 which, as shown best in FIG. 2, compresses and compacts the unconsolidated mass of clay 13 between the nip of the compacting rolls 15 to form a sheet-like body of compacted clay 16 which, in turn, is immediately broken up into a number of fragments or flakes 17 of approximately uniform size. The sheet-like body of compacted clay emerging from the compacting rolls 15 tends naturally to break up into fragments or flakes of approximately uniform size due to the relatively low mechanical strength of the compacted material. However, it may be desirable to assist the breaking up of the compacted clay particles into small fragments or flakes 17 by means of a star cutter 21, or similar device known in the art, as indicated schematically in FIG. 2.

The thickness of the body of compacted clay produced by the roll compacter 14 depends on the distance apart that the rolls 15 are spaced, and I have found that for best results the spacing of the rolls 15 should be such that the body of compacted clay is between about ¼ to ⅝ inch thick, and preferably is about ⅜ inch thick. The body of compacted clay breaks up into flakes that are, for the most part, approximately the same size, the flakes advantageously but not necessarily having a maximum dimension of not more than about 2 inches and a minimum dimension of not less than about ½ inch. However, as an appreciable quantity of fine particles (e.g., smaller than ½ inch) are unavoidably formed when the sheet-like body of compacted clay breaks up, and as these fine particles have a deleterious effect on the subsequent calcining operation, the flakes of compacted clay are screened by means of the screen 18 to remove all particles finer than about ½ inch, the undersize particles or fines 19 being returned to the raw clay storage bin 10 at the start of the process and the oversize or plus ½ inch particles 20 being delivered to the drying and pre-heating step of the process.

The flakes 20 of compacted clay are substantially all of approximately the same size, and advantageously are within the range of minus 2 inches and plus ½ inch in size. However, the somewhat moist "green" flakes 20 do not have sufficient mechanical strength to withstand the tumbling action of a rotary kiln without breaking down into a mass of fine particles and dust, and as a result I have found that they must be heated to a temperature of between about 300° to 800° F. to dry the flakes and to increase significantly their resistance to physical degradation. Accordingly, the green flakes 20 are delivered to a travelling grate pre-heater 22 wherein the flakes are heated to within the aforementioned temperature range by hot exhaust gases from the rotary kiln 23 in which the dry, pre-heated flakes are subsequently calcined.

The travelling grate pre-heater 22 comprises a plurality of transverse grate elements hingeably connected together to form an endless, chain-like grate structure 25 supported by rollers or wheels 26 in the manner known in the art. The apparatus is provided with a feed hopper 27 and with a hood-like chamber 28 that encloses the grate structure 25 and the upper end of the rotary kiln 23. The grate structure 25 moves or travels slowly from the feed end thereof beneath the feed hopper 27 to the discharge end adjacent the rotary kiln 23. The flakes 20 of compacted material are introduced into the feed hopper 27 of the traveling pre-heater and from thence onto the feed end of the grate structure 25. The flakes form a layer or bed of flakes 29 of approximately uniform depth on the upper surface of the grate structure, and as the grate travels toward the discharge end of the apparatus the bed of flakes on the grate is exposed to the hot exhaust gases from the rotary kiln 23 in which the flakes are to be subsequently calcined. The hot kiln gas issuing from the rotary kiln is confined by the hood-like chamber 28 enclosing the grate structure 25, the gas being drawn downwardly through the bed of flakes 29 by means of the induction fan or blower 30. The hot kiln gas drawn through bed of flakes 29 raises the temperature of the flakes on the travelling grate to within the range of 300° to 800° F., thereby driving off substantially all of the free moisture, and advantageously a portion of the combined water, content of the compacted clay and producing pre-heated particles or flakes of clay that have substantial mechanical strentgh. The kiln gas from the travelling grate pre-heater is drawn through a cyclone or other separatory apparatus 31 where dust and fine particles are removed from the gas, the dust-free gas then being drawn through the blower 30 and exhausted to the atmosphere. The dust and fine particles removed from the kiln gas in the cyclone are returned to the start of process where they are advantageously admixed with the raw clay in the storage bin 10.

The dry, pre-heated flakes of compacted clay discharged from the travelling grate pre-heater 22 are introduced into the upper or feed end of the rotary kiln 23. The flakes are moved toward the discharge end of the kiln by rotation of the kiln in the course of which the flakes are heated to the desired calcination temperature by the heat of combustion of fuel introduced into the lower or hot end of the kiln. As a result of my investigation into the relationship between the temperature at which the clay flakes are calcined and the percentage of the total aluminum content of the calcined clay that is extracted therefrom when the clay is leached with hydrochloric acid, I have found that the dry, pre-heated flakes should be calcined at a temperature of from about 1100° to 1450° F., and preferably at a temperature of from about 1200° to 1400° F., in order to obtain the consistently high yield of $Al_2O_3$ that is characteristic of my process. More specifically, as clearly shown in FIG. 3, when the dry, pre-heated flakes of clay are calcined at a temperature of from about 1200° to about 1400° F., at least 95% of the $Al_2O_3$ content of the clay may be extracted therefrom when the calcined clay is leached with acid. The calcined clay product is substantially completely dehydrated, and as a result of maintaining the calcining temperature below 1450° F. the conversion of the dehydrated aluminum silicate content thereof to a form that is not readily soluble in a mineral acid is minimized.

The hot flakes of dehydrated clay 34 discharged from the lower end of the kiln 23 are introduced into a suitable cooler 35 where they are cooled to a temperature at which they can be handled without difficulty. The cooled flakes are then advantageously ground or crushed in conventional grinding apparatus 37 to obtain a ground calcined product that is particularly amenable to extraction of the aluminum content thereof with a mineral acid.

The following example is illustrative but not limitative to the practice of my invention.

Georgia kaolin-containing clay having a free moisture content of between 18 to 23%, and having a particle size such that 40 to 60% was plus 4 inch material, was introduced into a crushing or shredding apparatus comprising essentially a hammer mill with a moving breaker plate to produce a shredded clay product comprising a mass of unconsolidated particles of the raw, somewhat moist clay at least about 90% of which were minus 1 inch and at least 50% of which were minus 3 mesh (Tyler Standard). The shredded raw clay was introduced into a roll compacter, the rolls of which were 24 inches in diameter and 8 inches in width, to produce a sheet-like body of compacted clay approximately ⅜ inch in thickness. The compacted clay emerging from the rolls of the roll compacter immediately broke up into flakes the largest of which were approximately 2 inches along their maximum dimension and over two-thirds of which were larger than ½ inch. The flakes of compacted clay were screened to separate the product into plus ½ inch and minus ½ inch fractions. The undersize or minus ½ inch fraction, which comprised not quite one-third of the compacter product, was recycled to the start of the process where it was mixed with the raw clay feed material.

The plus ½ inch fraction from the screen was introduced into the feed end of a travelling grate pre-heater of the type previously described wherein a bed of the flakes approximately 8 inches in depth was heated to a temperature of between about 500° to 600° F. by hot exhaust gases from the rotary kiln in which the dry and pre-heated flakes were subsequently calcined. The temperature of the hot exhaust gases from the rotary kiln before passing through the bed of flakes of compacted clay on the travelling grate was about 1000° to 1025° F., the temperature of the gas after passing through the bed was about 465° to 510° F., and the temperature of the gas after passing through the cyclone and the induced draft fan was about 360° F. Approximately 3750 pounds of compacted flakes were dried and partially dehydrated in the travelling grate pre-heater per hour.

The dry, partially dehydrated and pre-heated flakes of compacted clay were introduced into the upper or feed end of a rotary kiln 18 inches in diameter and 18 feet in length being rotated at a speed of 7 r.p.m. A mixture of fuel gas and air was introduced and burned at the lower or product discharge end of the rotary kiln to maintain a calcination temperature in this portion of the kiln of about 1400° F. The temperature of the kiln gases leaving the rotary kiln at the upper or feed end of the kiln was approximately 1035° F. The temperature of the calcined product discharged from the kiln was approximately 1350° F. The hot calcined flakes of compacted clay was introduced into a cooler where the flakes were cooled to a temperature of about 500° F. by a stream of cooling air which, after passing through the hot calcined product and removing much of the sensible heat therefrom was introduced into the lower end of the kiln as secondary calcination air.

The cooled calcined flakes of compacted clay were ground in a conventional roll mill to obtain a ground calcined product about 98% of which was smaller than 8 mesh, about 26% of which was smaller than 28 mesh and only about 2% was smaller than 200 mesh. The ground calcined material was then leached with hydrochloric acid to extract the aluminum content therefrom in the form of aluminum chloride. Approximately 99% of the aluminum content of the calcined product was recovered in the acid leach liquor.

From the foregoing description of my new process for preparing kaolin-containing clay for the extraction of the aluminum content thereof with a mineral acid it will be

I claim:

1. Process for preparing kaolin-containing clay for the extraction of the aluminum content thereof with a mineral acid which comprises
    compacting the raw moist clay into a sheet-like body of compacted clay having a thickness of between about 1/4 to 5/8 inch, the thus compacted clay immediately breaking up into flakes of approximately uniform size,
    subjecting the flakes of compacted clay to a sizing operation to remove substantially all particles of clay smaller than about 1/2 inch,
    heating the flakes of compacted clay to a temperature within the range of about 300° to 800° F. to drive substantially all of the free moisture and a portion of the combined water therefrom and thereby produce dry flakes of compacted clay having sufficient mechanical strength to withstand without excessive size degradation the tumbling action of a rotary kiln, and
    calcining the dry, pre-heated flakes of compacted clay at a temperature within the range of 1100° to 1450° F. for a sufficient length of time to drive substantially all of the remaining water from the clay and thereby produce flakes of dehydrated clay the aluminum content of which may readily be extracted therefrom by leaching with a mineral acid.

2. The process according to claim 1 in which substantially all of the flakes being heated have a maximum dimension of about 2 inches and are larger than about 1/2 inch mesh.

3. The process according to claim 1 in which the dry, pre-heated flakes are calcined at a temperature of from about 1200° to about 1400° F.

4. The process according to claim 1 in which the calcined flakes of dehydrated clay are ground to produce a calcined clay product substantially all of which is minus 8 mesh (Tyler Standard).

5. Process for preparing kaolin-containing clay for the extraction of the aluminum content thereof with a mineral acid which comprises
    pulverizing the raw kaolin-containing clay to obtain an unconsolidated mass of clay particles of approximately uniform size,
    compacting the unconsolidated mass of raw clay into a sheet-like body of compacted clay having a thickness of between about 1/4 to 5/8 inch, the thus compacted clay immediately breaking up into flakes of compacted clay of approximately uniform size,
    subjecting the flakes of compacted clay to a screening operation to remove substantially all particles of clay smaller than about 1/2 inch, and recycling the undersize particles of clay to the start of the process,
    heating the flakes of compacted clay to a temperature within the range of about 300° to 800° F. to drive substantially all of the free moisture and a portion of the combined water therefrom and thereby produce dry flakes of compacted clay having sufficient mechanical strength to withstand without excessive size degradation the tumbling action of a rotary kiln,
    calcining the dry, pre-heated flakes of compacted clay in a rotary kiln at a temperature within the range of 1200° to 1400° F. for a sufficient length of time to drive substantially all of the remaining water from the clay,
    cooling the dehydrated flakes of compacted clay, and
    grinding the cooled flakes of dehydrated clay so that substantially all of the calcined product is smaller than 8 mesh (Tyler Standard).

6. The process according to claim 5 in which substantially all of the flakes being heated have a maximum dimension of about 2 inches and are larger than about 1/2 inch.

7. The process according to claim 5 in which the flakes being heated are in a bed of flakes disposed on the grate of a travelling grate pre-heater, and in which the bed of flakes on said travelling grate are heated by hot exhaust gases from said rotary kiln which gases are drawn through said bed of flakes.

8. The process according to claim 7 in which the kiln gases drawn through the bed of flakes are treated to remove dust and fine particles therefrom, the dust and fine particles thus removed from the kiln gas being recycled to the start of the process.

References Cited

UNITED STATES PATENTS

| | | | |
|---|---|---|---|
| 2,881,051 | 4/1959 | Pignard | 23—313 |
| 3,240,561 | 3/1966 | Brown | 23—143 |

OTHER REFERENCES

Chem. Engrs. Handbook, Perry, editor, 3rd ed., 1950, p. 1608 relied on.

Kirk-Othmer, Encyl. of Chem. Technology, vol. 8, 1st edit., p. 362 relied on (1947).

V. Azbe: Rock Products (August 1946), vol. 49, pp. 90 and 91.

EDWARD J. MEROS, Primary Examiner

U.S. Cl. X.R.

23—143; 263—52